United States Patent
Kim et al.

(10) Patent No.: US 12,023,646 B2
(45) Date of Patent: Jul. 2, 2024

(54) PREPARATION METHOD OF SUPER ABSORBENT POLYMER

(71) Applicant: LG Chem, Ltd., Seoul (KR)

(72) Inventors: Tae Yun Kim, Daejeon (KR); Sung Soo Park, Daejeon (KR); Gicheul Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 705 days.

(21) Appl. No.: 17/266,826

(22) PCT Filed: Jun. 18, 2020

(86) PCT No.: PCT/KR2020/007931
§ 371 (c)(1),
(2) Date: Feb. 8, 2021

(87) PCT Pub. No.: WO2021/049738
PCT Pub. Date: Mar. 18, 2021

(65) Prior Publication Data
US 2021/0379563 A1 Dec. 9, 2021

(30) Foreign Application Priority Data

Sep. 11, 2019 (KR) .................. 10-2019-0113107
Jun. 17, 2020 (KR) .................. 10-2020-0073752

(51) Int. Cl.
| | | |
|---|---|---|
| B01J 20/30 | (2006.01) | |
| B01J 20/08 | (2006.01) | |
| B01J 20/10 | (2006.01) | |
| B01J 20/26 | (2006.01) | |
| B01J 20/28 | (2006.01) | |

(52) U.S. Cl.
CPC .......... *B01J 20/3021* (2013.01); *B01J 20/08* (2013.01); *B01J 20/103* (2013.01); *B01J 20/267* (2013.01); *B01J 20/28004* (2013.01); *B01J 20/3078* (2013.01); *B01J 2220/46* (2013.01); *B01J 2220/68* (2013.01)

(58) Field of Classification Search
CPC ........ B01J 20/08; B01J 20/103; B01J 20/267; B01J 20/28004; B01J 20/3021; B01J 20/3078; B29B 9/12; B29B 9/16; B29B 13/065; B29B 2009/125; C08J 3/205; C08J 2300/14; C08L 33/02; C08L 101/14; Y02W 30/62
See application file for complete search history.

(56) References Cited

U.S. PATENT DOCUMENTS

| | | |
|---|---|---|
| 5,342,899 A | 8/1994 | Graham et al. |
| 5,369,148 A | 11/1994 | Takahashi et al. |
| 5,407,939 A | 4/1995 | Panzeri et al. |
| 6,042,910 A | 3/2000 | Kinouchi et al. |
| 10,066,063 B2 | 9/2018 | Kim et al. |
| 2003/0013818 A1 | 1/2003 | Hakuta et al. |
| 2007/0066754 A1 | 3/2007 | Loeker et al. |
| 2010/0099781 A1 | 4/2010 | Tian et al. |
| 2011/0110730 A1 | 5/2011 | Nogi et al. |
| 2012/0302445 A1 | 11/2012 | Rudolph et al. |
| 2016/0045895 A1 | 2/2016 | Won et al. |
| 2017/0073478 A1 | 3/2017 | Joo et al. |
| 2017/0137581 A1 | 5/2017 | Park et al. |
| 2017/0166707 A1 | 6/2017 | Jang et al. |
| 2017/0326528 A1 | 11/2017 | Park et al. |
| 2018/0237593 A1 | 8/2018 | Nam et al. |
| 2019/0085104 A1 | 3/2019 | Yoon et al. |
| 2019/0315930 A1 | 10/2019 | Kim et al. |
| 2019/0329219 A1 | 10/2019 | Watabe et al. |
| 2020/0207929 A1 | 7/2020 | Nam et al. |

FOREIGN PATENT DOCUMENTS

| | | | |
|---|---|---|---|
| CN | 107922630 A | 4/2018 | |
| EP | 0401044 * | 5/1990 | .............. C08J 3/24 |
| EP | 0450922 A2 | 10/1991 | |
| EP | 0480031 A1 | 4/1992 | |
| EP | 1072630 A1 * | 1/2001 | ............. A61L 15/60 |
| EP | 3056521 A1 | 8/2016 | |
| EP | 3088446 A1 | 11/2016 | |
| EP | 3196231 A1 | 7/2017 | |
| EP | 3315538 A1 | 5/2018 | |

(Continued)

OTHER PUBLICATIONS

Morrow, B.A., et al., 1992, Journal of Physical Chemistry, 96, 1395-1400. <https://doi.org/10.1021/j100182a068> (Year: 1992).*
Liu, C.C., et al., 1996, Journal of the American Chemical Society, 118, 5103-5119. <https://doi.org/10.1021/ja954120w> (Year: 1996).*
Copéret, C. et al., 2016, Chemical Reviews, 116, 2, 323-421 [Office action cites pp. 329-330]. <https://doi.org/10.1021/acs.chemrev.5b00373> (Year: 2016).*
Thomas, A., 2019, Essentials of Polymer Flooding Technique, Wiley, 297 pp. [Office action cites p. 97]. (Year: 2019).*
Ahmed, E.M., 2015, Journal of Advanced Research, 6, 2, 105-121. <https://doi.org/10.1016/j.jare.2013.07.006> (Year: 2015).*
Aerosil R972 Description, Evonik Operations GmbH, 1 page. (Year: 0000).*
Schwalm, R; "UV Coating: Basics, Recent Developments and New Applications"; Elsevier Science; Dec. 21, 2006, p. 115.
Odian G; "Principles of Polymerization"; Second Edition: John Wiley & Sons 1933; p. 203.

(Continued)

*Primary Examiner* — Brian A McCaig
(74) *Attorney, Agent, or Firm* — Lerner David LLP

(57) ABSTRACT

A method of preparing a super absorbent polymer and a superabsorbent polymer prepared from the same are disclosed herein. In some embodiments, a method includes mixing a mixture comprising fines having a particle diameter of 150 μm or less, a surface-modified inorganic material having a reactive functional group, and water, and drying the mixture to prepare a fine powder reassembly. There may be provided a super absorbent polymer exhibiting excellent absorption properties and mechanical properties such as crushing strength while having uniform particle size distribution by effectively reassembling fines obtained inevitably in the preparation of a super absorbent polymer.

15 Claims, No Drawings

(56) References Cited

FOREIGN PATENT DOCUMENTS

| | | | |
|---|---|---|---|
| EP | 3502168 | A1 | 6/2019 |
| JP | S6424869 | A | 1/1989 |
| JP | H10204184 | A | 8/1998 |
| JP | 2019518815 | A | 7/2019 |
| JP | 2019524944 | A | 9/2019 |
| KR | 100231077 | B1 | 11/1999 |
| KR | 20060059983 | A | 6/2006 |
| KR | 20110087293 | A | 8/2011 |
| KR | 20150032045 | A | 3/2015 |
| KR | 20160016695 | A | 2/2016 |
| KR | 20160016713 | A | 2/2016 |
| KR | 20160091242 | A | 8/2016 |
| KR | 20170043838 | A | 4/2017 |
| KR | 20170092314 | A | 8/2017 |
| KR | 20190077541 | A | 7/2019 |
| NO | 2006101271 | A1 | 9/2006 |
| WO | 2001098407 | A1 | 12/2001 |
| WO | 2015084059 | A1 | 6/2015 |
| WO | 2016021899 | A1 | 2/2016 |
| WO | 2016021914 | A1 | 2/2016 |
| WO | 2016175428 | A1 | 11/2016 |
| WO | 2017-111205 | A1 | 6/2017 |

OTHER PUBLICATIONS

Korean Search Report for Application No. PCT/KR2020/007931, dated Sep. 23, 2020, 10 pages.
Buchholz, Fredric L. et al., Modern Superabsorbent Polymer Technology, 1998, Chapter 3 p. 69-103, Chapter 5 p. 167-178.
Catalog of AEROSIL, "Aerosil & Silanes", Jul. 12, 2002, Cover, p. 4 middle col. L.2-3, p. 4 drawing, p. 28.
Third Party Observation for Application No. PCT/KR2020/007931 submitted Jan. 7, 2022, 14 pgs.
Extended European Search Report including Written Opinion for Application No. 20842662.7 dated Nov. 11, 2021, pp. 1-7.

\* cited by examiner

PREPARATION METHOD OF SUPER ABSORBENT POLYMER

CROSS-REFERENCE TO RELATED APPLICATION

The present application is a national phase entry under 35 U.S.C. § 371 of International Application No. PCT/KR2020/007931, filed on Jun. 18, 2020, which claims priority from Korean Patent Applications No. 10-2019-0113107 filed on Sep. 11, 2019, and No. 10-2020-0073752, filed on Jun. 17, 2020, the disclosures of which are incorporated by reference herein.

TECHNICAL FIELD

The present disclosure relates to a preparation method of a super absorbent polymer.

BACKGROUND OF ART

A super absorbent polymer (SAP) is a type of synthetic polymeric material capable of absorbing 500 to 1000 times its own weight of moisture. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

An absorption mechanism of the super absorbent polymer is governed by interaction of penetration pressure due to the difference in electrical attraction caused by charges of a polymer electrolyte, affinity between water and a polymer electrolyte, molecular expansion due to repulsion between polymer electrolyte ions, and inhibition of expansion due to cross-linking. In other words, water absorbency of the super absorbent polymer depends on the affinity and molecular expansion, and an absorption rate is largely dependent on the osmotic pressure of the absorbent polymer itself.

Meanwhile, particles having a particle diameter of 150 $\mu$m or less, which are inevitably generated in the preparation of a super absorbent polymer, are called fines, and it is known that the fines are generated in an amount of about 20 to 30% in the pulverization or transfer process during the preparation of a super absorbent polymer. When such fines are included in the super absorbent polymer, they may cause a reduction in main physical properties of the super absorbent polymer such as absorbency under pressure or water permeability. For this reason, during the preparation of a super absorbent polymer, particularly in a classification process, the fines are separated to produce the super absorbent polymer only with the remaining polymer particles.

In addition, the separated fines are produced again into large particles by a reassembly process, and a preparation method of a super absorbent polymer using these reassembled particles is known. As a representative method of the reassembly method, a preparation method of a fine powder reassembly and a super absorbent polymer by mixing the fines with water is known.

In the reassembly process, if the amount of water used is increased, cohesive strength of the fines increases, but a reassembled mass may be generated in the reassembly process, which may cause problems during operation of the process, and the amount of energy used during a drying process increases, resulting in high costs. Furthermore, if moisture is not properly removed by drying after reassembly, problems such as an increase in the load on the device for preparing a super absorbent polymer, and the like, may occur.

Conversely, if the amount of water used in the reassembly process is reduced, there are disadvantages in that cohesive strength of the assembly is not sufficient, a generation amount of re-fines which are reduced into the fines without properly performing the reassembly process is greatly increased, and physical properties such as absorbency of the super absorbent polymer produced by the reassembly process are not sufficient.

Accordingly, the development of a reassembly process of fines capable of solving the above-mentioned problems is continuously required.

DETAILED DESCRIPTION OF THE INVENTION

Technical Problem

There is provided a preparation method of a super absorbent polymer that can solve the above-mentioned problems by mixing fines obtained inevitably in the process of preparing a super absorbent polymer with a surface-modified inorganic material having a reactive functional group.

Technical Solution

According to an embodiment of the present disclosure, there is provided a preparation method of a super absorbent polymer, including a step of mixing and drying fines having a particle diameter of 150 $\mu$m or less obtained in the preparation step of a super absorbent polymer, a surface-modified inorganic material having a reactive functional group, and water to prepare a fine powder reassembly.

Advantageous Effects

According to an embodiment of the present disclosure, there is provided a preparation method of a super absorbent polymer exhibiting excellent absorption properties and mechanical properties such as crushing strength while having uniform particle size distribution by effectively reassembling fines obtained inevitably in the preparation of a super absorbent polymer.

DETAILED DESCRIPTION OF THE EMBODIMENTS

Hereinafter, a preparation method of a super absorbent polymer according to a specific embodiment of the present disclosure will be described.

The "polymer" in the present disclosure is in a state in which a water-soluble ethylene-based unsaturated monomer is polymerized, and may include all moisture content ranges, all particle diameter ranges, all surface cross-linking states, or processing states. Among the polymers, a polymer having a moisture content of about 40 wt % or more which is in a state after polymerization and before drying may be referred to as a "hydrogel polymer". Further, among the polymers, a polymer having a particle diameter of 150 $\mu$m or less may be referred to as "fines".

The term "super absorbent polymer" refers to the polymer itself, or includes all the polymers that have been made suitable for commercialization through additional processes, such as surface cross-linking, fine powder reassembly, drying, pulverizing, classification, and the like, depending on the context.

The "particle diameter or particle size" may be measured by a standard sieve analysis or a laser diffraction method, unless otherwise specified herein. The "average particle diameter or weight average particle diameter" may mean a particle diameter (D50) at 50% of the weight percentage in the particle size distribution curve obtained by laser diffraction. In the present disclosure, fine particles having a particle diameter of a predetermined particle size or less, i.e., about 150 μm or less, are referred to as a super absorbent polymer fine powder, a SAP fine powder or a fine powder (fines), and particles having a particle diameter of more than 150 μm and 850 μm or less are referred to as normal particles.

According to an embodiment of the present disclosure, there is provided a preparation method of a super absorbent polymer, including a step of mixing and drying fines having a particle diameter of 150 μm or less obtained in the preparation step of a super absorbent polymer, a surface-modified inorganic material having a reactive functional group, and water to prepare a fine powder reassembly.

The fines having a particle diameter of 150 μm or less may be generated during the preparation of a super absorbent polymer. When the fines are included in final products, it is difficult to handle, and physical properties may be deteriorated, for example, gel blocking phenomenon may occur, and the like. Therefore, research on a method of reassembling the fines obtained in the preparation step of a super absorbent polymer to be normal particles has been continued. As a result of continuous experiments by the present inventors, it was confirmed that when reassembling the fines using a surface-modified inorganic material having a reactive functional group, it is possible to obtain a fine powder reassembly having excellent strength and uniform particle size distribution.

Hereinafter, a preparation method of a super absorbent polymer of an embodiment will be described in detail.

The fines having a particle diameter of 150 μm or less includes fines obtained in the preparation step of a super absorbent polymer.

The preparation step of a super absorbent polymer may include a first step of forming a hydrogel polymer by polymerizing a monomer mixture containing a water-soluble ethylene-based unsaturated monomer and a polymerization initiator; and a second step of drying and pulverizing the hydrogel polymer, and then performing classification into normal particles having a particle diameter of more than 150 μm and 850 μm or less and fines having a particle diameter of 150 μm or less, or may further include a third step of surface cross-linking the normal particles, and then performing classification into surface cross-linked normal particles having a particle diameter of more than 150 μm and 850 μm or less and surface cross-linked fines having a particle diameter of 150 μm or less. According to an embodiment of the present disclosure, the preparation method of a super absorbent polymer may further include a step of surface cross-linking the fine powder reassembly, or surface cross-linking the fine powder reassembly and normal particles. According to an embodiment of the present disclosure, the preparation method of a super absorbent polymer may further include a step of classifying the surface cross-linked super absorbent polymer obtained in the surface cross-linking step into surface cross-linked normal particles having a particle diameter of more than 150 μm and 850 μm or less and surface cross-linked fines having a particle diameter of 150 μm or less, wherein the surface cross-linked fines are added in the preparation step of the fine powder reassembly.

The fines having a particle diameter of 150 μm or less may be fines obtained in the second step, fines obtained in the third step, or a mixture of fines obtained in the second and third steps.

Since cohesive strength may be weakened when a large amount of the surface cross-linked fines obtained in the third step is included, the amount of the surface cross-linked fines may be adjusted to 50 wt % or less, 30 wt % or less, or 10 wt % or less, based on the total fines.

The preparation step of the super absorbent polymer will be described in detail.

In the preparation step of the super absorbent polymer, a hydrogel polymer is first prepared.

The hydrogel polymer may be prepared by polymerizing a monomer mixture containing a water-soluble ethylene-based unsaturated monomer and a polymerization initiator.

The water-soluble ethylene-based unsaturated monomer may be any monomer commonly used in the preparation of a super absorbent polymer. Herein, at least one monomer selected from the group consisting of an anionic monomer, a salt thereof, a nonionic hydrophilic monomer, an amino-containing unsaturated monomer, and a quaternary compound thereof may be used.

Specifically, at least one selected from the group consisting of an anionic monomer of (meth)acrylic acid, maleic anhydride, fumalic acid, crotonic acid, itaconic acid, 2-(meth)acryloylethane sulfonic acid, 2-(meth)acryloylpropane sulfonic acid, or 2-(meth)acrylamide-2-methyl propane sulfonic acid, and a salt thereof; a nonionic hydrophilic monomer of (meth)acrylamide, N-substituted (meth)acrylamide, 2-hydroxyethyl(meth)acrylate, 2-hydroxypropyl(meth)acrylate, methoxypolyethyleneglycol(meth)acrylate, or polyethyleneglycol(meth)acrylate; and an amino-containing unsaturated monomer of (N,N)-dimethylaminoethyl(meth)acrylate or (N,N)-dimethylaminopropyl(meth)acrylamide, and a quaternary compound thereof may be used.

More preferably, acrylic acid or a salt thereof, for example, acrylic acid or an alkali metal salt thereof such as sodium salt, may be used. By using the monomer, it becomes possible to prepare a super absorbent polymer having superior physical properties. When the alkali metal salt of acrylic acid is used as the monomer, it is possible to use acrylic acid after neutralizing the same with a basic compound such as sodium hydroxide (NaOH).

A concentration of the water-soluble ethylene-based unsaturated monomer may be about 20 to 60 wt %, or about 40 to 50 wt % based on the monomer composition containing the raw materials of the super absorbent polymer and a solvent, and properly controlled in consideration of polymerization time and reaction conditions. When the concentration of the monomer is excessively low, the yield of the super absorbent polymer is low and there may be a problem in economic efficiency. In contrast, when the concentration is excessively high, it may cause problems in processes in that some of the monomer may be extracted or the pulverization efficiency of the polymerized hydrogel polymer may be lowered in the pulverization process, and thus physical properties of the super absorbent polymer may be deteriorated.

The polymerization initiator used in the first step is not particularly limited as long as it is generally used for the preparation of a super absorbent polymer.

Specifically, the polymerization initiator may be an initiator for thermal polymerization or an initiator for photo-polymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial Lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present disclosure is not limited thereto.

A concentration of the photopolymerization initiator in the monomer mixture may be about 0.01 to about 1.0 wt %. When the concentration of the photopolymerization initiator is excessively low, the polymerization rate may become slow, and when the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

A concentration of the thermal polymerization initiator included in the monomer mixture may be 0.001 to 0.5 wt %. When the concentration of the thermal polymerization initiator is excessively low, additional thermal polymerization hardly occurs and there may be less effect of adding the thermal polymerization initiator. When the concentration of the thermal polymerization initiator is excessively high, the molecular weight of the super absorbent polymer may become low and the properties may be uneven.

The monomer mixture of the first step may further include an internal cross-linking agent as a raw material of the super absorbent polymer. The internal cross-linking agent may be a cross-linking agent having one or more ethylene-based unsaturated groups in addition to the functional group which may react with the water-soluble substituents of the water-soluble ethylene-based unsaturated monomer; or a cross-linking agent having two or more functional groups which may react with the water-soluble substituents of the monomer and/or the water-soluble substituents formed by hydrolysis of the monomer.

As the specific example of the internal cross-linking agent, a C8-C12 bisacrylamide, bismethacrylamide, a poly(meth)acrylate of C2-C10 polyol, a poly(meth)allylether of C2-C10 polyol, or the like may be used. More specifically, one or more agents selected from the group consisting of N,N'-methylenebis(meth)acrylate, ethyleneoxy(meth)acrylate, polyethyleneoxy(meth)acrylate, propyleneoxy(meth)acrylate, glycerin diaciylate, glycerin triacrylate, trimethylol triacrylate, triallylamine, triarylcyanurate, triallylisocyanate, polyethyleneglycol, diethyleneglycol, and propyleneglycol may be used.

This internal cross-linking agent may be included at a concentration of 0.01 to 0.5 wt % based on the monomer mixture, so that the polymerized polymer can be cross-linked.

The monomer mixture may further include a thickener, a plasticizer, a preservation stabilizer, an antioxidant, or the like, if necessary.

The raw materials such as the water-soluble ethylene-based unsaturated monomer, the photopolymerization initiator, the thermal polymerization initiator, the internal cross-linking agent, and the additive may be prepared in the form of a monomer mixture solution dissolved in a solvent.

At this time, any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used alone or in combination.

The solvent may be included in the monomer mixture at a residual quantity except for the above components.

Meanwhile, the method of preparing the hydrogel polymer by polymerizing the monomer mixture is not particularly limited if it is a common polymerization method for preparing a super absorbent polymer.

Specifically, the polymerization method is largely divided into the thermal polymerization and the photopolymerization according to an energy source of the polymerization. In the case of thermal polymerization, it is generally carried out in a reactor having a kneading spindle, such as a kneader. In the case of photopolymerization, it may be carried out in a reactor equipped with a movable conveyor belt. However, the polymerization method is just an example, and the present disclosure is not limited thereto.

For example, in the reactor equipped with an agitation spindle such as a kneader, the hydrogel polymer obtained by thermal polymerization by supplying hot air or heating the reactor may be discharged to a reactor outlet in the form of several centimeters to several millimeters depending on a shape of the agitation spindle provided in the reactor. Specifically, a size of the hydrogel polymer obtained may vary depending on the concentration and injection rate of the monomer mixture to be injected, and a hydrogel polymer having a weight average particle diameter of 2 to 50 mm may be usually obtained.

In addition, when photopolymerization is performed in the reactor equipped with a movable conveyor belt as described above, a hydrogel polymer in the form of a sheet having a belt width may usually be obtained. At this time, a thickness of the polymer sheet may vary depending on the concentration and injection rate of the monomer composition to be injected, and it is preferable to supply the monomer composition so that the polymer in the form of a sheet has a thickness of 0.5 to 5 cm. When the monomer composition is supplied to such an extent that the thickness of the polymer sheet is too thin, the production efficiency may be low. When the thickness of the polymer sheet exceeds 5 cm, the polymerization reaction may not occur evenly over the entire thickness due to the excessively thick thickness.

Generally, the moisture content of the hydrogel polymer obtained by the above method may be 40 to 80 wt %. At this time, "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to about 180° C. and maintained at 180° C., and the total drying time is 20 min including 5 min of a heating step.

A coarse pulverization process may be selectively performed on the hydrogel polymer obtained in the first step.

Herein, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the coarse pulverization step, the hydrogel polymer may be crushed to have a diameter of about 2 to 20 mm.

It is technically difficult to coarsely pulverize the hydrogel polymer to have a diameter of less than 2 mm because of its high moisture content, and there may be a phenomenon that the crushed particles cohere with each other. Meanwhile, when the polymer is coarsely pulverized to have a diameter of larger than 20 mm, the efficiency enhancing effect in the subsequent drying step may be low.

In the second step, the hydrogel polymer obtained in the first step may be dried and pulverized, and then classified into fines and normal particles.

The drying process is performed on the hydrogel polymer, which is coarsely pulverized, or immediately after polymerization and not subjected to a coarse pulverization step. At this time, the drying temperature of the drying step may be about 150 to about 250° C. When the drying temperature is lower than about 150° C., the drying time may become excessively long and the properties of the super absorbent polymer finally prepared may decrease. And when the drying temperature is higher than about 250° C., the surface of the polymer is excessively dried, a large amount of fines may be generated, and properties of the super absorbent polymer finally prepared may decrease. Therefore, the drying process may preferably be carried out at a temperature of about 150 to about 200° C., more preferably at a temperature of about 160 to about 180° C.

Furthermore, the drying time may be about 20 to about 90 minutes in consideration of process efficiency, but it is not limited thereto.

The drying method in the drying step is not particularly limited if it has been generally used in the drying process of the hydrogel polymer. Specifically, the drying step may be carried out by the method of hot air provision, infrared radiation, microwave radiation, UV ray radiation, and the like. The moisture content of the polymer after the drying step may be about 0.1 to about 10 wt %.

Subsequently, a pulverization process is performed on the dried polymer obtained from the drying step.

The polymer powder obtained after the pulverization step may have a diameter of 150 to 850 µm. In order to pulverize the polymer into such diameter, a pin mill, a hammer mill, a screw mill, a roll mill, a disc mill, or a jog mill may be used as the pulverizer, but the present disclosure is not limited thereto.

In order to control the properties of the super absorbent polymer powder which is finally commercialized after the pulverization step, the polymer powder obtained after pulverization is generally classified according to the particle diameter. Specifically, the above-described fines can be obtained by classifying the polymer powder into normal particles having a particle diameter of more than about 150 µm and 850 µm or less and particles having a diameter of 150 µm or less.

The normal particles obtained in the second step may be introduced into the third step, if necessary, and surface cross-linked and classified to provide surface cross-linked normal particles having a particle diameter of more than 150 µm and 850 µm or less and surface cross-linked fines having a particle diameter of 150 µm or less.

The surface cross-linking is a step of increasing a cross-linking density near the surface of super absorbent polymer particles with regard to a cross-linking density inside the particles. Generally, surface cross-linking agents are applied on the surface of super absorbent polymer particles. Therefore, surface cross-linking reactions occur on the surface of the super absorbent polymer particles, which improves cross-linkability on the surface of the particles without substantially affecting the inside of the particles. Thus, the surface cross-linked super absorbent polymer particles have a higher degree of cross-linking at the surface than inside.

Herein, the surface cross-linking agent is not particularly limited as long as it is a compound capable of reacting with functional groups of the polymer.

Preferably, in order to improve the properties of the prepared super absorbent polymer, at least one selected from the group consisting of a polyalcohol-based compound; an epoxy compound; a polyamine compound; a haloepoxy compound; a condensation product of the haloepoxy compound; an oxazoline compound; a mono-, di- or polyoxazolidinone compound; a cyclic urea compound; a polyvalent metal salt; and an alkylene carbonate compound may be used as the surface cross-linking agent.

Specific examples of the polyalcohol-based compound may include one or more selected from the group consisting of mono-, di-, tri-, tetra- or polyethylene glycol, monopropylene glycol, dipropylene glycol, polypropylene glycol, 2,3,4-trimethyl-1,3-pentanediol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy-based compound may include ethylene glycol diglycidyl ether, glycidol and the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, and α-methylephichlorohydrin. Meanwhile, the mono-, di-, or polyoxazolidinone compound may include, for example, 2-oxazolidinone or the like.

Further, the alkylene carbonate-based compound may include ethylene carbonate, and the like. These may be used alone or in combination with each other. Meanwhile, to increase the efficiency of the surface cross-linking process, one or more of the polyalcohol-based compound may be preferably included among these surface cross-linking agents. More preferably, polyalcohol-based compounds having 2 to 10 carbon atoms may be used.

The amount of the surface cross-linking agent added may be appropriately selected depending on the kind of the surface cross-linking agent added or the reaction conditions. However, the surface cross-linking agent may be generally used in an amount of about 0.001 to about 5 parts by weight, preferably about 0.01 to about 3 parts by weight, and more preferably about 0.05 to about 2 parts by weight, based on 100 parts by weight of the polymer.

When the amount of the surface cross-linking agent is excessively small, the surface cross-linking reaction hardly occurs, and when the amount is higher than 5 parts by weight based on 100 parts by weight of the polymer, absorption performance and physical properties may be decreased due to excessive surface cross-linking reaction.

The cross-linking reaction and the drying process may be carried out simultaneously by heating the polymer particles to which the surface cross-linking agent is added.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present disclosure is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

After the surface cross-linking, classification into surface cross-linked fines having a particle diameter of 150 μm or less and surface cross-linked normal particles having a particle diameter of more than 150 μm and 850 μm or less may be performed to obtain surface cross-linked fines having a particle diameter of 150 μm or less.

In the preparation method of a super absorbent polymer according to the above embodiment, a super absorbent polymer may be prepared through a reassembly process of aggregating the fines obtained in the preparation step of the super absorbent polymer to a normal particle size.

Specifically, when mixing the fines with a surface-modified inorganic material having a reactive functional group, it is possible to obtain a fine powder reassembly having high cohesive strength and uniform particle size distribution.

The surface-modified inorganic material has a reactive functional group capable of forming a covalent bond with the fines. Thus, a fine powder reassembly with high cohesive strength may be prepared by forming a covalent bond with the fines.

Specifically, the surface-modified inorganic material has at least one reactive functional group selected from the group consisting of an epoxy group, an oxetane group, a hydroxyl group, and an isocyanate group to prepare a fine powder reassembly with high cohesive strength and excellent mechanical properties such as crushing strength.

Such a surface-modified inorganic material may be prepared by reacting an inorganic material with a surface modifier having the reactive functional group. As a specific example of the surface modifier, a silane compound represented by the following Chemical Formula 1 may be exemplified.

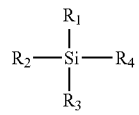

[Chemical Formula 1]

in Chemical Formula 1, $R_1$ to $R_4$ are each independently halogen, a C1 to C10 alkyl group, a C1 to C10 alkoxy group, or -L-R, provided that at least one of $R_1$ to $R_4$ is -L-R, L is a single bond, or a C1 to C10 alkylene group, and R is an epoxy group, an oxetane group, a hydroxyl group, or an isocyanate group.

For example, the surface-modified inorganic material may have an epoxy group to prepare a fine powder reassembly having particularly excellent mechanical properties such as cohesive strength and crushing strength.

As the inorganic material, silica, alumina, or a mixture thereof may be used to achieve excellent physical properties of the super absorbent polymer, and fumed silica or colloidal silica may be used as the silica.

The surface-modified inorganic material may have an average particle diameter of 1 to 20 nm. Within this range, a fine powder reassembly having high cohesive strength and excellent water absorption properties may be prepared.

In the preparation of the fine powder reassembly, the surface-modified inorganic material may be used in an amount of 0.01 to 1 parts by weight, 0.1 to 1 parts by weight, 0.01 to 0.8 parts by weight, or 0.1 to 0.5 parts by weight based on 100 parts by weight of the fines. Within this range, a fine powder reassembly having excellent mechanical properties such as crushing strength while exhibiting excellent water absorption properties may be prepared.

In the preparation step of the fine powder reassembly, water may be added to the fines to aggregate the fines. The content of water to be added can be adjusted to 80 to 120 parts by weight based on 100 parts by weight of the fines. When the content of water to be added is less than the above range, it is difficult to uniformly disperse a small amount of water due to a high absorption rate of the fines, and thus there is a concern that uniformity of the fine powder reassembly may be reduced. In addition, when the moisture content of the fine powder reassembly is lowered, the amount of generated re-fines may be increased, and absorbency of the final super absorbent polymer may be deteriorated. Conversely, when the content of water exceeds the above range, stickiness of the fine powder reassembly is increased, so that the mixing is not normally performed, and there is a concern that a load on a dryer may be increased due to an increase in the amount of water to be evaporated in the drying process.

A temperature of the water added to the preparation step of the fine powder reassembly may be adjusted to 40° C. to 90° C., 50° C. to 90° C., 60° C. to 90° C., 70° C. to 90° C., 40° C. to 80° C. or 50° C. to 80° C., so as not to impose a load on the device for preparing the fine powder reassembly while improving cohesive strength of the fine powder reassembly.

The timing of adding the water is not particularly limited. The fines and the surface-modified inorganic material may be added to water, or the fines may be mixed with the surface-modified inorganic material, and then water may be added to the obtained mixture.

In the preparation step of the fine powder reassembly, the fines, the surface-modified inorganic material and water may be mixed by stirring at 10 to 2000 rpm, 100 to 1000 rpm or 500 to 800 rpm with a mixing device or mixer capable of applying a shear force.

In the preparation step of the fine powder reassembly, the fines, the surface-modified inorganic material, and water may be mixed and then dried to form a covalent bond between the fines and the surface-modified inorganic material. The drying temperature may be adjusted according to the content of water added in the preparation of the fine powder reassembly. For example, the drying process may be performed at 120 to 220° C. to form a fine powder reassembly with improved cohesive strength through covalent bonding, and the moisture content of the fine powder reassembly may be adjusted to about 1 to 2 wt % within a suitable time.

The drying process may be performed using a conventional drying device, but according to an embodiment of the present disclosure, it may be performed using a hot air dryer, a paddle-type dryer, or a forced circulation-type dryer. The heating means for drying in the drying process is not particularly limited. Specifically, it is possible to provide a thermal media or provide a heat source such as electricity thereto for direct heating, but the present disclosure is not limited thereto. Examples of the usable heat source may include steam, electricity, ultraviolet rays, infrared rays, heated thermal fluids, and the like.

Subsequently, in the preparation method of a super absorbent polymer according to an embodiment of the present disclosure, the fine powder reassembly obtained in the above step is pulverized, if necessary, and classified into reassembly fines (hereinafter referred to as 're-fines') and reassembly normal particles.

The fine powder reassembly obtained in the preparation step of a fine powder reassembly has high cohesive strength, thereby having a low proportion at which the fine particles are re-crushed again into fines after the pulverization step, that is, a low proportion of formation of re-fines.

The fine powder reassembly may be pulverized to have a particle diameter of about 150 to about 850 μm. In order to pulverize the fine powder reassembly into such diameter, a pin mill, a hammer mill, a screw mill, a roll mill, a disc mill, or a jog mill may be used as the pulverizer, but the present disclosure is not limited thereto.

In order to control physical properties of the super absorbent polymer powder which is manufactured as a final product after the pulverization step, the polymer powder obtained after pulverization is generally classified according to the particle diameter. Preferably, the polymer powder is subjected to the classifying step into re-fines having a particle diameter of 150 μm or less and reassembly normal particles having a particle diameter of more than 150 μm and 850 μm or less.

Meanwhile, in the preparation method of a super absorbent polymer according to an embodiment of the present disclosure, the super absorbent polymer may be provided or prepared by using the fine powder reassembly prepared by the above-described method, particularly, the reassembly normal particles alone. However, the super absorbent polymer may also be prepared by mixing the reassembly normal particles with non-reassembled normal particles obtained in the second step, followed by surface cross-linking in the third step.

Specifically, the re-fines having a particle diameter of 150 μm or less after the classification are circulated to the fine reassembly process, and the reassembly normal particles having a particle diameter of more than 150 μm and 850 μm or less are mixed with the normal particles described above.

In addition, after the mixing process, a surface cross-linking process may be selectively performed by further introducing the reassembly normal particles and the normal particles into a surface cross-linking mixer. Since the surface cross-linking process has been described in detail above, a detailed description thereof is omitted here.

After the surface cross-linking of the reassembly normal particles having a particle diameter of more than 150 μm and 850 μm or less and the non-reassembled normal particles obtained in the second step, it may be classified into surface cross-linked fines having a particle diameter of 150 μm or less and surface cross-linked normal particles having a particle diameter of more than 150 μm and 850 μm or less. Thereafter, the surface cross-linked fines having a particle diameter of 150 μm or less may be re-put into a fine reassembly process, and the surface cross-linked normal particles may be manufactured and used as products.

The super absorbent polymer prepared by the above-described method is prepared from fines, but may exhibit uniform particle size distribution with excellent mechanical properties such as crushing strength by adding a surface-modified inorganic material having a reactive functional group during reassembly of fines.

Hereinafter, the function and effect of the present invention will be described in more detail through specific examples. However, these examples are for illustrative purposes only, and the invention is not intended to be limited by these examples.

Preparation Example: Preparation of Fines 100 g of acrylic acid, 0.3 g of polyethyleneglycol diacrylate as a cross-linking agent, 0.033 g of IRGACURE 819 as an initiator, 38.9 g of caustic soda (NaOH), and 103.9 g of water were mixed to prepare a monomer mixture.

Then, the monomer mixture was put on a continuously moving conveyor belt, irradiated with ultraviolet light (irradiation amount: 2 mW/cm$^2$), followed by UV polymerization for 2 minutes, thereby obtaining a hydrogel polymer.

The hydrogel polymer was pulverized with a meat chopper (hole size of 10 mm) to obtain a coarse-pulverized hydrogel polymer. The hydrogel polymer was dried in a hot air dryer at 170° C. for 1 hour, pulverized with a pin mill, and classified with a ASTM standard mesh to obtain normal particles having a particle diameter of more than 150 μm and 850 μm or less and fines (hereinafter referred to as 'first fines') having a particle diameter of 150 μm or less.

Thereafter, 100 g of the normal particles were mixed with a cross-linking solution containing 3 g of water, 3.5 g of methanol, and 0.4 g of ethylene carbonate, followed by a surface cross-linking reaction at 190° C. for 50 minutes. Then, the obtained product was pulverized and classified to obtain surface cross-linked normal particles having a particle diameter of more than 150 μm and 850 μm or less, and surface cross-linked fines (hereinafter referred to as 'second fines') having a particle diameter of 150 μm or less.

Example 1: Preparation of Super Absorbent Polymer 70 g of the first fines, 30 g of the second fines obtained in the above Preparation Example, and 0.5 g of silica surface-modified with (3-glycidoxypropyl) trimethoxysilane (Bindzil CC301, average particle diameter: 7 nm, manufactured by Akzonobel) were added to 100 g of water at 80° C., followed by stirring at 650 rpm for 1 minute.

A reassembly collected inside the mixer was dried in a hot air dryer at a temperature of 170° C. for 1 hour, pulverized with a hammer mill, and then classified to prepare a super absorbent polymer having a particle diameter of more than 150 μm and 850 μm or less.

Example 2: Preparation of Super Absorbent Polymer 100 g of the first fines obtained in the above Preparation Example, and 0.1 g of silica surface-modified with (3-glycidoxypropyl) trimethoxysilane (Bindzil CC401, average particle diameter: 12 nm, manufactured by Akzonobel) were added to 100 g of water at 80° C., followed by stirring at 650 rpm for 1 minute.

A reassembly collected inside the mixer was dried in a hot air dryer at a temperature of 170° C. for 1 hour, pulverized with a hammer mill, and then classified to prepare a super absorbent polymer having a particle diameter of more than 150 μm and 850 μm or less.

Comparative Example 1: Preparation of Super Absorbent Polymer 70 g of the first fines and 30 g of the second fines obtained in the above Preparation Example were added to 100 g of water at 80° C., followed by stirring at 650 rpm for 1 minute.

A reassembly collected inside the mixer was dried in a hot air dryer at a temperature of 170° C. for 1 hour, pulverized with a hammer mill, and then classified to prepare a super absorbent polymer having a particle diameter of more than 150 μm and 850 μm or less.

Comparative Example 2: Preparation of Super Absorbent Polymer 100 g of the first fines obtained in the above Preparation Example were added to 100 g of water at 80° C., followed by stirring at 650 rpm for 1 minute.

A reassembly collected inside the mixer was dried in a hot air dryer at a temperature of 170° C. for 1 hour, pulverized with a hammer mill, and then classified to prepare a super absorbent polymer having a particle diameter of more than 150 μm and 850 μm or less.

Comparative Example 3: Preparation of Super Absorbent Polymer 70 g of the first fines, 30 g of the second fines obtained in the above Preparation Example, and 0.5 g of silica surface-modified with dimethyldichlorosilane (DM30S, manufactured by Tokuyama) were added to 100 g of water at 80° C., followed by stirring at 650 rpm for 1 minute.

A reassembly collected inside the mixer was dried in a hot air dryer at a temperature of 170° C. for 1 hour, pulverized with a hammer mill, and then classified to prepare a super absorbent polymer having a particle diameter of more than 150 μm and 850 μm or less.

Comparative Example 4: Preparation of Super Absorbent Polymer 100 g of acrylic acid, 0.1 g of silica surface-modified with (3-glycidoxypropyl) trimethoxysilane (Bindzil CC301, average particle diameter: 7 nm, manufactured by Akzonobel), 0.3 g of polyethyleneglycol diacrylate as a cross-linking agent, 0.033 g of IRGACURE 819 as an initiator, 38.9 g of caustic soda (NaOH), and 103.9 g of water were mixed to prepare a monomer mixture.

Then, the monomer mixture was put on a continuously moving conveyor belt, irradiated with ultraviolet light (irradiation amount: 2 mW/cm$^2$), followed by UV polymerization for 2 minutes, thereby obtaining a hydrogel polymer.

The hydrogel polymer was pulverized with a meat chopper (hole size of 10 mm) to obtain a coarse-pulverized hydrogel polymer. The hydrogel polymer was dried in a hot air dryer at 170° C. for 1 hour, pulverized with a pin mill, and classified with a ASTM standard mesh to obtain normal particles having a particle diameter of more than 150 μm and 850 μm or less and fines having a particle diameter of 150 μm or less.

Thereafter, 100 g of the fines were added to 100 g of water at 80° C., followed by stirring at 650 rpm for 1 minute.

A reassembly collected inside the mixer was dried in a hot air dryer at a temperature of 170° C. for 1 hour, pulverized with a hammer mill, and then classified to prepare a super absorbent polymer having a particle diameter of more than 150 μm and 850 μm or less.

Comparative Example 5: Preparation of Super Absorbent Polymer 100 g of acrylic acid, 0.3 g of polyethyleneglycol diacrylate as a cross-linking agent, 0.033 g of IRGACURE 819 as an initiator, 38.9 g of caustic soda (NaOH), and 103.9 g of water were mixed to prepare a monomer mixture.

Then, the monomer mixture was put on a continuously moving conveyor belt, irradiated with ultraviolet light (irradiation amount: 2 mW/cm$^2$), followed by UV polymerization for 2 minutes, thereby obtaining a hydrogel polymer.

The hydrogel polymer was pulverized with a meat chopper (hole size of 10 mm) to obtain a coarse-pulverized hydrogel polymer. The hydrogel polymer was dried in a hot air dryer at 170° C. for 1 hour, pulverized with a pin mill, and classified with a ASTM standard mesh to obtain a base resin having a particle diameter of more than 150 μm and 850 μm or less.

Thereafter, 100 g of the base resin was mixed with a cross-linking solution containing 3 g of water, 3.5 g of methanol, 0.4 g of ethylene carbonate, and 0.1 g of silica surface-modified with (3-glycidoxypropyl) trimethoxysilane (Bindzil CC301, average particle diameter: 7 nm, manufactured by Akzonobel), followed by a surface cross-linking reaction at 190° C. for 50 minutes. Then, the obtained product was pulverized and classified to obtain surface cross-linked normal particles having a particle diameter of more than 150 μm and 850 μm or less, and surface cross-linked fines having a particle diameter of 150 μm or less.

30 g of the surface cross-linked fines and 70 g of the first fines obtained in the above Preparation Example were added to 100 g of water at 80° C., followed by stirring at 650 rpm for 1 minute.

A reassembly collected inside the mixer was dried in a hot air dryer at a temperature of 170° C. for 1 hour, pulverized with a hammer mill, and then classified to prepare a super absorbent polymer having a particle diameter of more than 150 μm and 850 μm or less.

Experimental Example: Evaluation of Physical Properties of Super Absorbent Polymer The physical properties of the super absorbent polymers prepared in Examples and Comparative Examples were measured in the following manner and are shown in Table 1.

1. Crushing Strength

The force at which the super absorbent polymer single particles were pressed was measured when a XT2plus equipment manufactured from Text Analyzer (TA) equipped with a cylinder having a diameter of 8 mm was used to press the single particles at a constant rate of 0.01 mm/s. The force that the super absorbent polymer withstood was gradually increased as the equipment went down, and when the force exceeded a predetermined value, crush occurred. In this case, the maximum force that the particles could withstand was defined as crushing strength (kgForce). After the maximum force was measured 10 times, a normal distribution curve was drawn to obtain an average value while excluding 5% from the right and left. In addition, the average value was shown in Table 1 below. Further, a standard deviation of the crushing strength which was measured 10 times was also calculated and shown in Table 1 below.

2. Generation Amount of Re-Fines

The weight of re-fines having a particle diameter of 150 μm or less obtained after drying, pulverizing, and classifying a fine powder reassembly was measured. Then, a percentage of the weight of re-fines to the total weight of the fine powder reassembly after drying was evaluated as the generation amount of re-fines.

TABLE 1

|  | Crushing strength (kgf) | Standard deviation | Generation amount of re-fines (wt %) |
| --- | --- | --- | --- |
| Example 1 | 1.40 | 0.08 | 8 |
| Example 2 | 1.32 | 0.02 | 12 |
| Comparative Example 1 | 1.17 | 0.24 | 15 |
| Comparative Example 2 | 0.98 | 0.29 | 17 |
| Comparative Example 3 | 1.20 | 0.20 | 13 |
| Comparative Example 4 | 0.88 | 0.22 | 15 |
| Comparative Example 5 | 0.98 | 0.30 | 16 |

Referring to Table 1 above, it is confirmed that the super absorbent polymer prepared by the preparation method according to an embodiment of the present disclosure can exhibit improved crushing strength by using a surface-modified inorganic material having a reactive functional group.

The invention claimed is:

1. A method of preparing a super absorbent polymer, comprising:
   mixing a mixture comprising fines having a particle diameter of 150 μm or less, a surface-modified inorganic material having a reactive functional group, and water, wherein the fines are obtained during preparation of a hydrogel polymer or during preparation of a surface-crosslinked hydrogel polymer; and
   drying the mixture to prepare a fine powder reassembly, wherein the inorganic material of the surface-modified inorganic material comprises silica, alumina, or a mixture thereof.

2. The method of claim 1,
   wherein the fines comprise first fines having a particle diameter of 150 μm or less, and
   wherein the method further comprises:
   polymerizing a monomer mixture to form the hydrogel polymer, wherein the monomer mixture contains a water-soluble ethylene-based unsaturated monomer and a polymerization initiator;
   drying and pulverizing the hydrogel polymer; and
   classifying the dried and pulverized hydrogel polymer to obtain normal particles having a particle diameter of more than 150 μm and 850 μm or less and the first fines having a particle diameter of 150 μm or less.

3. The method of claim 2, further comprising:
   surface cross-linking the fine powder reassembly.

4. The method of claim 3,
   wherein classifying the fine powder assembly further comprises:
   classifying the surface cross-linked fine powder assembly to obtain the super absorbent polymer having a particle diameter of more than 150 μm and 850 μm or less and surface cross-linked fines having a particle diameter of 150 μm or less,
   wherein the surface cross-linked fines can be utilized for preparation of a fine powder reassembly.

5. The method of claim 2, further comprising:
   surface cross-linking the fine powder reassembly and the normal particles.

6. The method of claim 5,
   wherein classifying the fine powder assembly further comprises:
   classifying the surface cross-linked fine powder assembly and normal particles to obtain the super absorbent polymer having a particle diameter of more than 150 μm and 850 μm or less and surface cross-linked fines having a particle diameter of 150 μm or less,
   wherein the surface cross-linked fines can be utilized for preparation of a fine powder reassembly.

7. The method of claim 1,
   wherein the fines comprise first fines having a particle diameter of 150 μm or less and second fines having a particle diameter of 150 μm or less, and
   the method further comprises:
   polymerizing a monomer mixture to form a hydrogel polymer, wherein the monomer mixture contains a water-soluble ethylene-based unsaturated monomer and a polymerization initiator;
   drying and pulverizing the hydrogel polymer;
   classifying the dried and pulverized hydrogel polymer to obtain normal particles having a particle diameter of more than 150 μm and 850 μm or less and the first fines having a particle diameter of 150 μm or less;
   surface cross-linking the normal particles;
   pulverizing the surface cross-linked normal particles; and
   classifying the surface cross-linked normal particles to obtain surface-crosslinked normal particles having a particle diameter of more than 150 μm and 850 μm or less and the second fines having a particle diameter of 150 μm or less.

8. The method of claim 1,
   wherein the reactive functional group of the surface-modified inorganic material is at least one selected from the group consisting of an epoxy group, an oxetane group, a hydroxyl group, and an isocyanate group.

9. The method of claim 1,
   wherein the surface-modified inorganic material has an average particle diameter of 1 to 20 nm.

10. The method of claim 1,
    wherein the surface-modified inorganic material is present in an amount of 0.01 to 1 parts by weight based on 100 parts by weight of the fines.

11. The method of claim 1,
wherein the water is present in an amount of 80 to 120 parts by weight based on 100 parts by weight of the fines.
12. The method of claim 1,
wherein a temperature of the water is 40° C. to 90° C.
13. The method of claim 1,
wherein drying is performed at 120° C. to 220° C.
14. The method of claim 1, further comprising:
classifying the fine powder reassembly to obtain the super absorbent polymer having a particle diameter of more than 150 μm and 850 μm or less and re-fines having a particle diameter of 150 μm or less.
15. The method of claim 14,
wherein the re-fines can be utilized for preparation of a fine powder reassembly.

* * * * *